Figure 6:
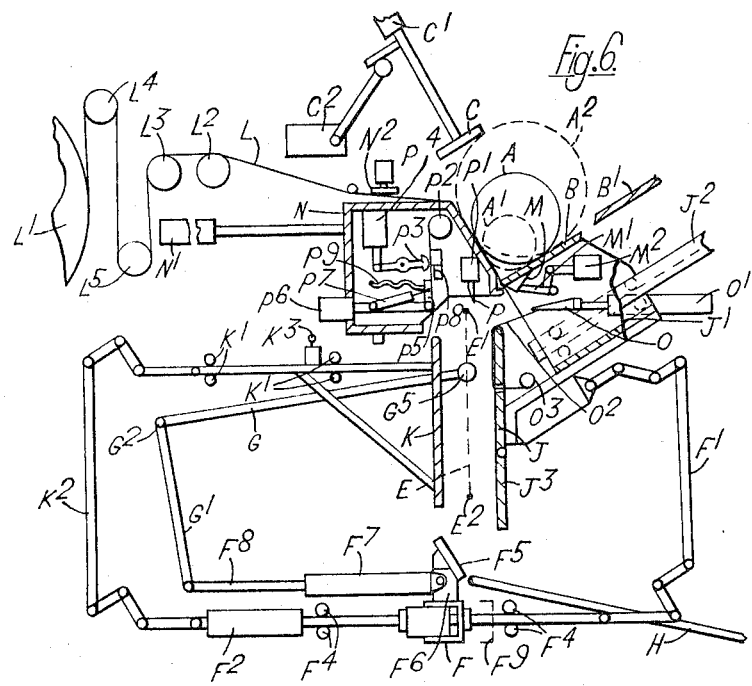

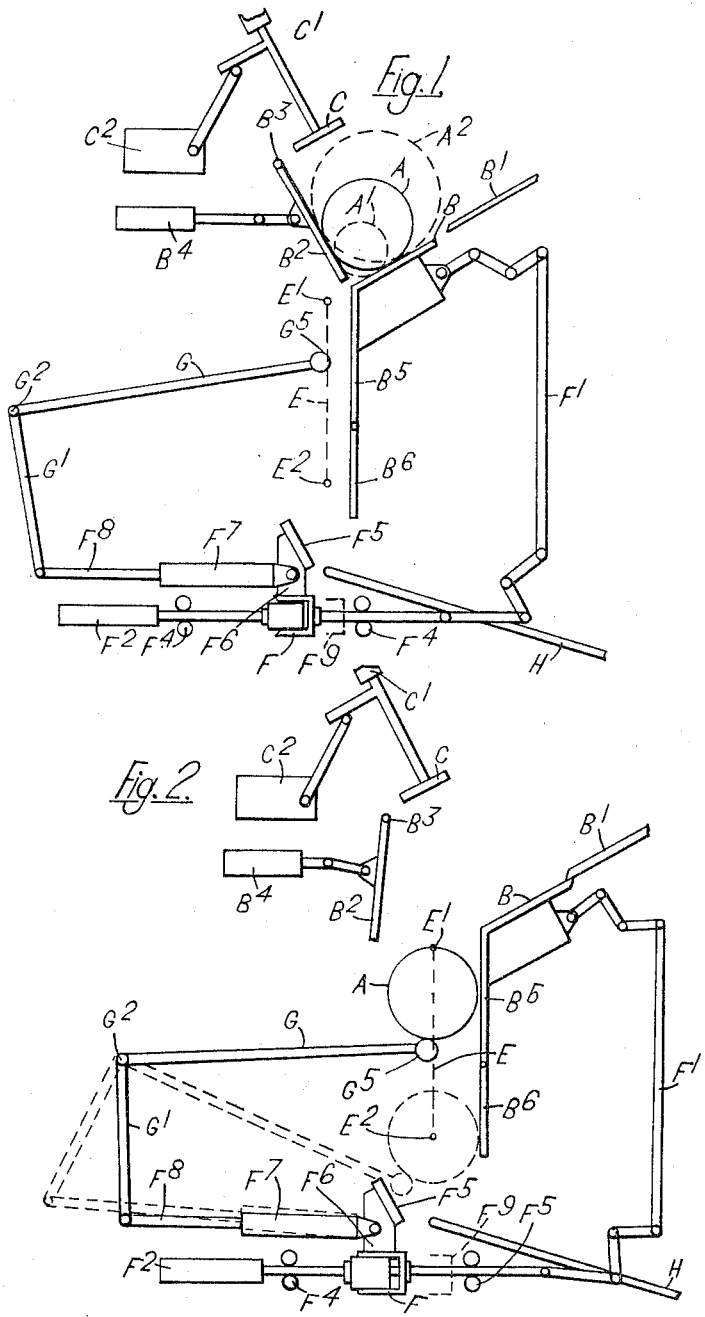

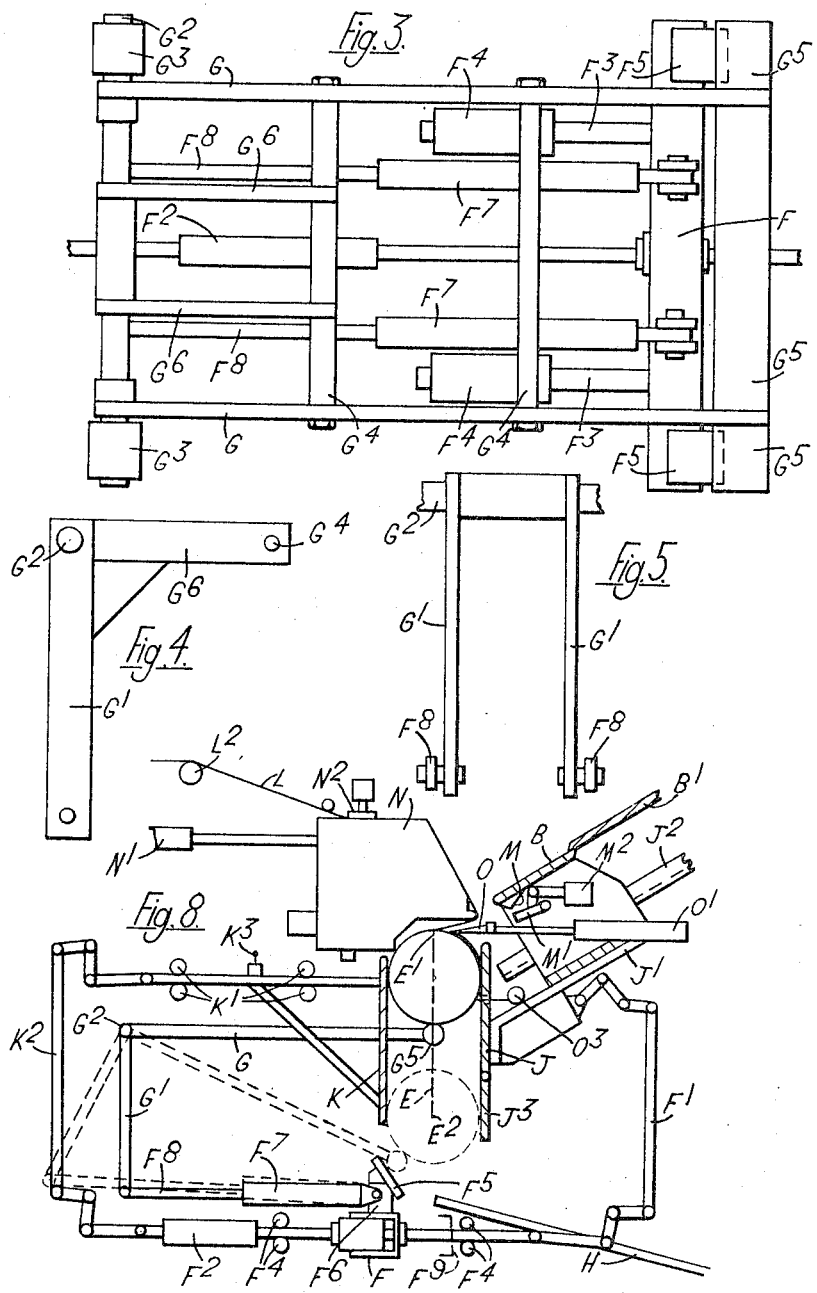

Nov. 1, 1966     J. H. A. S. LAGESSE     3,282,022
TRANSFER MECHANISM FOR LOCATING A BODY IN TURN
IN TWO OPERATIVE POSITIONS
Filed Oct. 7, 1963     4 Sheets-Sheet 3

Inventor
J. H. A. S. Lagesse
By
Attorney

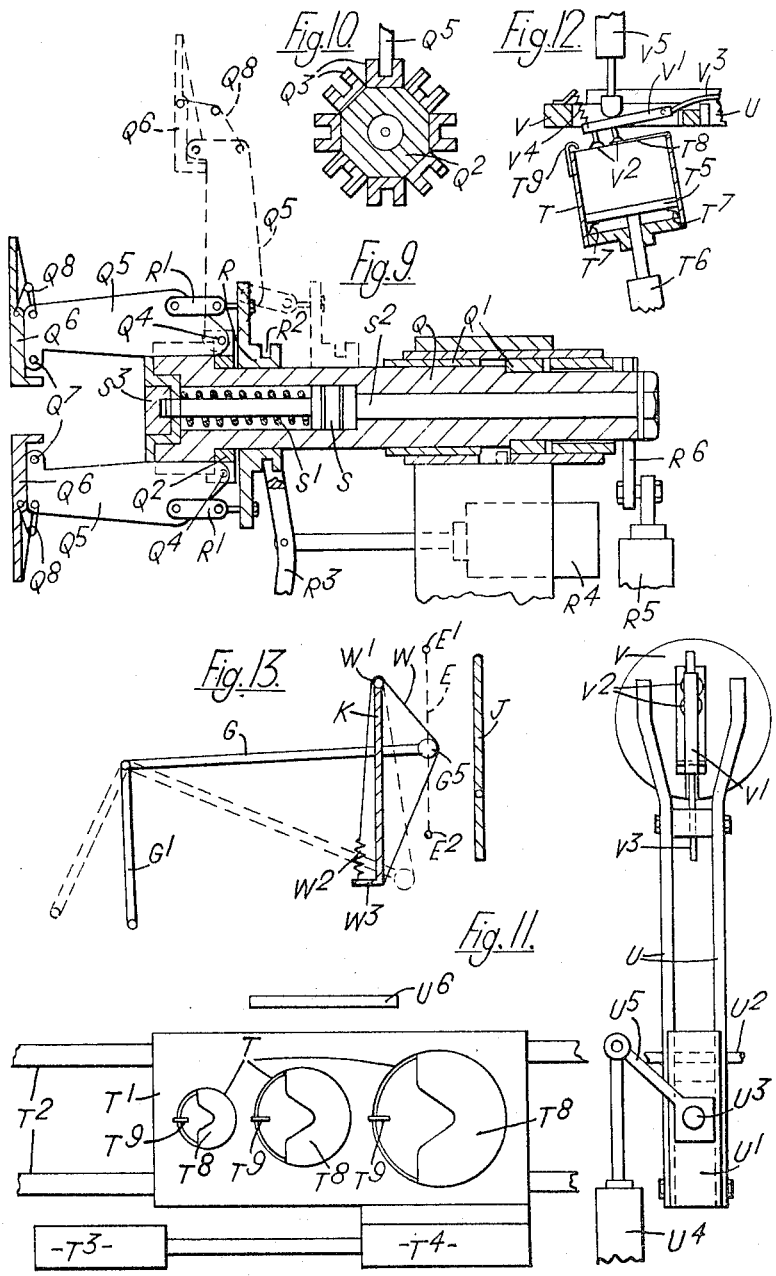

United States Patent Office 3,282,022
Patented Nov. 1, 1966

3,282,022
TRANSFER MECHANISM FOR LOCATING A BODY IN TURN IN TWO OPERATIVE POSITIONS
Joseph Henri Alfred Serge Lagesse, Wembley, England, assignor to Tape Engineering Limited, London, England, a company of Great Britain
Filed Oct. 7, 1963, Ser. No. 314,369
19 Claims. (Cl. 53—210)

This invention relates to transfer mechanism for locating a body (which at least for part of its length is of generally cylindrical shape having a diameter which may have any value within a predetermined range) in turn in two operative positions in one of which (hereinafter referred to as the "peripheral operative position") one of the generators of the cylindrical surface of the body coincides with a predetermined fixed datum line (hereinafter termed the "fixed peripheral datum"), whilst in the other (hereinafter termed the "axial operative position") the cylinder axis of the body coincides with another predetermined fixed datum line (hereinafter termed the "fixed axial datum") parallel to the fixed peripheral datum. Whilst applicable to other purposes, the transfer mechanism is more especially intended for use in a wrapping machine for enclosing in wrapping material a "roll" having any diameter within the predetermined range, the term "roll" being herein used in a broad sense to include any article having a generally cylindrical shape or an assembly of articles (for example a number of discs) collectively having a generally cylindrical shape. The invention also relates to such a wrapping machine incorporating the transfer mechanism.

The transfer mechanism according to the present invention comprises in combination a gauging device for measuring the diameter of the roll or other body, control means responsive to the operation of the gauging device, a stop device positioned by the control means in accordance with the diameter of the body for engaging with part of the cylindrical surface of the body and thereby locating the body in one of its two operative positions, abutment means also positioned by the control means in accordance with the diameter of the body, and means for releasing the stop device to permit movement of the body into its other operative position determined by the abutment means.

Although, if desired, the body may directly engage with the abutment means in the second operative position, it will usually be preferable for the stop device on release to move into engagement with the abutment means and thereby itself to act in cooperation with the abutment means to locate the body in the second operative position. Thus, for locating the body in the peripheral operative position, the stop device may be positoned by the control means at a distance from the fixed peripheral datum approximately equal to the diameter of the body, so as to engage with a part of the cylindrical surface of the body remote from that generator of such surface which is to concide with the fixed peripheral datum, whilst for locating the body in the axial operative position the stop device may be located at a distance from the fixed axial datum equal to half the diameter of the body.

The stop device is preferably carried on the end of a transfer arm constituting one arm of a pivoted two-armed crank lever, the second arm of which is operated by the control means on operation of the gauging device. The transmission ratio of the crank lever will depend, not only on the movement imparted to its second arm by the control means, but also on the order in which the two operative positions are to be occupied by the body. In some uses of the transfer mechanism, it may be convenient for the body to occupy first its axial operative position and thereafter its peripheral operative position, and in such case the end of the second arm of the lever may be moved by the control means to a position at a distance from a fixed zero equal to half the diameter of the body divided by the transmission ratio of the crank lever.

In other uses of the transfer mechanism, including use in the wrapping machine above mentioned, it is more convenient for the body to occupy first its peripheral operative position and thereafter its axial operative position. In such case, the end of the second lever arm may be moved by the control means to a position at a distance from a fixed zero equal to the diameter of the body divided by the transmission ratio of the crank lever. Thus, such distance may be equal to half the diameter of the body, the transfer arm being twice as long as the second lever arm. To simplify the mechanism, it will usually be convenient for the abutment means, which may consist of a cam, to be moved by the control means simultaneously with and in approximately the same direction as the end of the second lever arm, so that in the case just mentioned with a 2:1 lever ratio the abutment means will likewise be moved by the control means to a position at a distance from a fixed zero equal to half the diameter of the body.

The release of the stop device may conveniently be effected by breaking the operative connection between such device and the control means. Thus, the abutment means may be connected to the second lever arm through a fluid pressure device, through which the positioning drive from the control means is transmitted to such lever arm, the pressure fluid being exhausted from such device to effect the release of the stop device whilst leaving the abutment means in its operative position.

It will usually be convenient for the body to be guided to move along a straight line path parallel to the plane containing the two fixed datum lines in its movement from the first to the second operative position. Thus, a movable wall may be used to guide the body in such movement, the wall being moved by the control means on operation of the gauging device to a position distant half the diameter of the body from the plane containing the two fixed datum lines, so that the cylinder axis of the body remains in such plane during the movement. The body is preferably urged, by gravity or otherwise, into engagement both with the stop device and with the movable wall during its movement between the two operative positions.

Whilst the transfer mechanism according to the invention is applicable to a variety of purposes, it is especially useful in a wrapping machine for enclosing in wrapping material a "roll" (as defined above) having any diameter within a predetermined range.

In accordance, therefore, with a further feature of the invention, such a wrapping machine incorporates a transfer mechanism as above described in accordance with the main feature of the invention, for locating the roll in turn in the peripheral operative position for the wrapping of the cylindrical surface of the roll, and in the axial operative position for a further operation requiring centering of the axis of the roll. Such further operation may consist for example of printing on the ends of the roll or inserting stub shafts or other devices in the ends of the roll or fitting end caps on to the roll, but in many instances the further operation will consist of wrapping the ends of the roll, in which case the roll will first be located in the peripheral operative position and thereafter in the axial operative position. Such wrapping machine preferably includes means whereby the roll to be wrapped is fed first to the gauging device for the measurement of its diameter and the consequent positioning of the stop device and the abutment means in accordance with such diameter, and thereafter into engagement with the wrapping material which is carried with the roll in its further movement until arrested by the stop device in the peripheral operative position, whereby the wrapping material is wrapped around part of the cylindrical surface of the roll, means whereby in such peripheral operative position the wrapping of the remainder of the cylindrical surface of the roll is completed, the arrangement being such that the tube of wrapping material thus formed around the roll projects beyond the ends of the roll, means for effecting the release of the stop device after completion of the wrapping of the cylindrical surface of the roll whereby the roll is moved into the axial operative position, and means whereby in the axial operative position the projecting ends of the tube of wrapping material are folded against the ends of the roll and such folded ends are sealed in position.

The wrapping of the cylindrical surface of the roll may be effected in various ways but is preferably effected in accordance with either or both of the inventions forming the subject of the present applicant's copending United States patent applications Serial Nos. 299,204, now Patent No. 3,251,171 and 298,046. The closure of the ends of the wrapping may likewise be effected in various ways but is preferably effected in the manner forming the subject of the present applicant's copending United States patent applications Serial Nos. 260,580, now Patent No. 3,200,564 and 271,227.

The present invention may be carried into practice in various ways, but one convenient construction of transfer mechanism according thereto will now be described with reference to the accompanying drawings, this construction being especially suitable for incorporation in a wrapping machine according to the invention, of which a preferred construction is also illustrated in the accompanying drawings.

Figure 7:
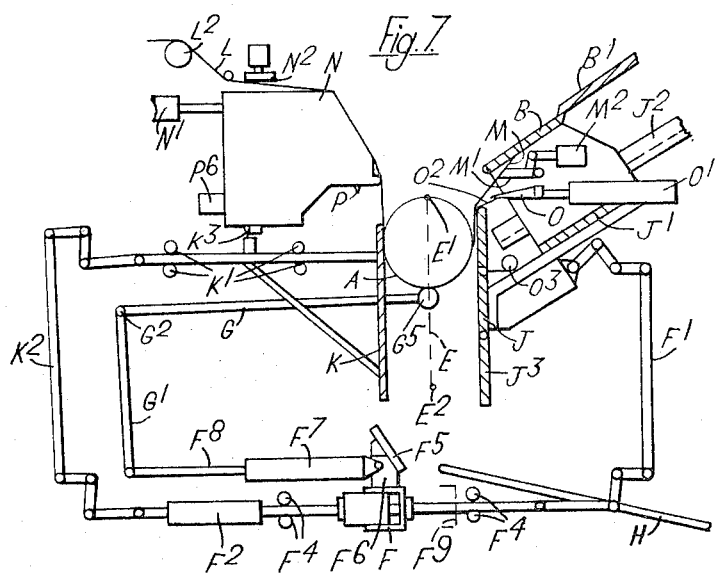

In the drawings,

FIGURE 1 diagrammatically illustrates one arrangement of the transfer mechanism, FIGURE 2 is a view similar to that of FIGURE 1 showing the parts in a different operative position, FIGURE 3 shows in plan view a convenient practical construction for the transfer arm employed in the arrangement of FIGURES 1 and 2, FIGURES 4 and 5 respectively show a front elevation and a side elevation of the second arm of the crank lever of which the transfer arm of FIGURE 3 constitutes the first arm, FIGURES 6, 7 and 8 are diagrammatic views similar to those of FIGURES 1 and 2 illustrating a preferred construction of wrapping machine incorporating the transfer mechanism of FIGURES 1–5, for enclosing a roll in wrapping material, respectively in three operative positions associated with the wrapping of the peripheral surface of the roll, FIGURES 9 and 10 illustrate mechanism for folding the ends of the wrapping material over the ends of the roll, after the peripheral surface has been wrapped by the mechanism of FIGURES 6–8, FIGURES 11 and 12 illustrate mechanism for sealing the folded ends of the wrapping material, and FIGURE 13 is a partial view illustrating a modification of the wrapping machine of FIGURES 6–12.

For simplicity of description of the construction of transfer mechanism shown in FIGURES 1–5, it will be assumed that the bodies to be dealt with by the mechanism consist of rolls (as above defined), and the preferred construction is such as to be capable of dealing with rolls having any diameter within a predetermined range (for example from four to ten inches). These dimensions are given by way of example only as typical of mechanism for dealing with relatively large rolls, but it will be clear that mechanism of generally similar construction can be used for dealing with a corresponding range of smaller diameters, or, if desired, with a range of still larger diameters.

In this construction, the roll A to be wrapped, which may have any diameter within a predetermined range, the smallest and largest sizes being indicated in dotted lines respectively at $A^1$ and $A^2$, is fed to the machine down an inclined ramp, which is formed in two parts B and $B^1$, the lower part B being movable, whilst the upper part $B^1$ is fixed. The roll A to be wrapped is arrested in a gauging position near the lower end of the ramp by a stop lever $B^2$ movable about a fixed pivot $B^3$ under the control of a pneumatic cylinder $B^4$. The engagement of the roll A with the stop lever $B^2$ operates a trip device (not shown) for bringing the gauging device into operation.

The gauging device may be arranged in various ways, but in one simple arrangement consists of a sensing plate C, which lies parallel to the inclined ramp B, $B^1$ and is movable by a pneumatic cylinder $C^1$ in a direction at right angles thereto, so as to engage with the surface of the roll A and thus to measure its diameter. The gauging device actuates a pneumatic control device, indicated at $C^2$, which controls the setting of various parts of the transfer mechanism in accordance with the roll diameter. This pneumatic control device may be of any of the known types capable of effecting pneumatic control in accordance with the extent of movement of an actuating element.

The lower part B of the inclined ramp is movable in a direction parallel to the inclination of the ramp. A gap is left between the movable and fixed parts of the ramp, which is small enough to permit the smallest size roll to pass over it, thus shortening the total length of the ramp. In some instances the relationship between the smallest and largest diameters of roll within the range may be much that this gap can be made wide enough to take the full movement of the lower part of the ramp, thus permitting the two parts of the ramp to lie in the same plane, or alternatively the lower part may slide past the upper part. A vertical wall $B^5$ extends downwardly from the lower edge of the ramp B and is movable therewith. This vertical wall $B^5$ normally lies in a position in which its horizontal distance from a fixed datum plane E (joining the fixed peripheral datum line $E^1$ and the fixed axial datum line $E^2$) is equal to half the smallest diameter in the range of roll diameters with which the mechanism can deal, and the movement of the lower part B of the inclined ramp is effected through a linkage mechanism $F^1$ from a control bar F moved by a pneumatic ram $F^2$ controlled by the pneumatic control device $C^2$, so that in its operative position, the vertical wall $B^5$ will be horizontally spaced from the fixed datum plane E by a distance equal to half the diameter of the actual roll A, whose diameter has been measured by the gauging device.

The control bar F, which actuates the linkage $F^1$ for setting the inclined ramp B in position, extends horizontally parallel to the axis of the roll A and is moved by the pneumatic ram $F^2$ in a horizontal direction transverse to its length, the movement being accurately guided by two shafts $F^3$ (shown in FIGURE 3) fixed to the control bar F and movable in linear ball bearings $F^4$. The control bar F carries two spaced similar cams $F^5$, which together constitute the abutment means, to be referred to later. Also secured to the control bar F are two blocks $F^6$ to each of which is pivoted one end of a pneumatic cylinder $F^7$ (the "release" cylinder) from the other end of which the piston rod $F^8$ projects. This piston rod $F^8$ is pivoted at its free end to the lower end of the shorter arm $G^1$ of a crank lever carried by a shaft $G^2$ journalled at $G^3$ extending parallel to the length of the control bar F. The longer arm G (the transfer arm) of this lever consists of a pair of spaced parallel arms rigidly strutted together at $G^4$ and carrying at their free ends a shaft on which are mounted rollers $G^5$ together constituting the stop device of the transfer mechanism. The shorter arm $G^1$ likewise consists (as shown in FIGURES 4 and 5) of two arms carried on the shaft $G^2$ and each having an extension $G^6$ at right angles attached to one of the struts $G^4$.

The control bar F normally occupies a position spaced horizontally from a zero (indicated at $F^9$) by half the smallest roll diameter in the range, and when a particular roll A has been gauged by the gauging device C, $C^1$, the pneumatic control device $C^2$ actuates the pneumatic ram $F^2$ to move the control bar F into a position spaced from the zero $F^9$ by half the actual diameter of the roll, thereby similarly setting the abutment means $F^5$ in its operative position. At this stage, the release cylinders $F^7$ are charged with air under pressure, so that there is no relative movement between the piston rod $F^8$ and the cylinder $F^7$ and the movement of the control bar F is transmitted to the end of the shorter arm $G^1$ of the crank lever. The transfer arm G is at right angles to such shorter arm F and has an effective length twice that of the shorter arm, so that the stop device $G^5$ at the free end of the transfer arm moves in a generally vertical direction through twice the distance moved by the end of the shorter arm. In its normal position the stop device $G^5$ lies substantially at a distance vertically below the fixed peripheral datum $E^1$ equal to the smallest diameter in the range of roll diameters, so that when a particular roll has been gauged by the gauging device, the stop device is moved downwardly into a position in which it lies substantially at a distance equal to the actual roll diameter below the fixed peripheral datum.

When the stop device $G^5$, the abutment means $F^5$ and the inclined ramp B and vertical wall $B^5$ have been set in position in accordance with the diameter of the actual roll A, a trip device (not shown) is operated to release the roll so that it can move forward from the gauging position. The roll A falls down past the lower edge of the ramp B and is arrested in its downward movement by the stop device $G^5$, so that it is brought into the peripheral operative position as shown in full line in FIGURE 2, wherein it is supported by the stop device $G^5$ and the vertical wall $B^5$. In this position the stop device engages with the cylindrical surface of the roll close to the lowermost generator of such surface, and since the stop device is spaced below the fixed peripheral datum $E^1$ substantially by the diameter of the roll and the vertical wall $B^5$ is spaced horizontally from such datum by half the diameter of the roll, it will be clear that the uppermost generator of the cylindrical surface of the roll coincides with the fixed peripheral datum.

In practice, it is sometimes convenient slightly to offset the stop device from the vertical plane E through the fixed peripheral datum $E^1$, so that the roll A will be slightly urged towards the vertical wall $B^5$ and will thus seat itself snugly against the wall and against the stop device, the amount of such offsetting however being small enough to have negligible effect on the vertical positioning of the roll. Alternatively, as will be described later with respect to FIGURES 6–8, a second vertical wall may be provided which is moved horizontally by the control bar F through a suitable parallel linkage mechanism at the same rate as the horizontal movement of the vertical wall carried by the inclined ramp, but in the opposite direction thereto, so that it will be spaced from the fixed peripheral datum $E^1$ by half the diameter of the roll. The two vertical walls will thus be spaced from one another by the diameter of the roll and the roll will thus be vertically guided on both sides.

The roll A is thus properly located in its peripheral operative position with the uppermost generator of its cylindrical surface coincident with the fixed peripheral datum $E^1$, and in this position it can be subjected to any desired process such for example as printing on its surface or affixing a label to the surface or (as will be described later with reference to the wrapping machine) enclosing its peripheral surface in wrapping material.

When such process has been completed, a trip device (not shown) is operated which causes the compressed air in the release cylinders $F^7$ to be exhausted therefrom. The stop device $G^5$ is thus no longer supported and is moved downwardly owing to the weight of the roll A. This downward movement continues until the stop device rollers $G^5$ come into engagement with the two cams constituting the abutment device $F^5$. It should be mentioned that the transfer arm G is of considerable length so that, in its arcuate path about the pivot $G^2$ of the crank lever, the stop device $G^5$ does not deviate greatly from a vertical movement. The vertical height of the crank lever pivot $G^2$ is chosen so as to be approximately midway between the vertical heights of the stop device in its upper and lower operative positions.

The shape of the abutment cams $F^5$ is such that when they are engaged by the stop device rollers, the stop device will support the roll A with its cylinder axis coincident with a fixed datum line, namely the fixed axial datum $E^2$ (as indicated in dotted line in FIGURE 2). It has been found that, with the parts arranged in the manner described in this preferred construction, the cam shape should consist of a plane surface inclined at 33 degrees to the vertical.

It will be appreciated that by exhausting the release cylinders $F^7$, the stop device $G^5$ has been released, whilst leaving the abutment cams $F^5$ and the vertical wall or walls still set in position in accordance with the actual roll diameter.

The roll A is now properly located in its axial operative position in which its cylinder axis coincides with the fixed axial datum $E^2$, whatever the diameter of the roll may be, and in this position the roll can be subjected to any desired process requiring such axial location, for example charging the interior of the roll (if hollow) with any desired matter through an axial end orifice or performing an operation on or through the end surfaces of the roll, such as fitting the roll with a properly centered axial shaft, or (as will be described later with reference to the wrapping machine) completing the end wrapping of a roll already wrapped around its peripheral surface in the peripheral operative position.

When such operation has been completed, a suitable trip device (not shown) may be operated to release the roll and allow it to be discharged from the mechanism. This may be effected for example by releasing a hinged lever portion $B^6$ of the vertical wall $B^5$, to permit the roll A to fall from the axial operative position on to a discharge ramp H. The same trip device, or another trip device operated when the roll runs down the discharge ramp H, also acts to cause the parts of the mechanism to be reset back to their normal positions in readiness to deal with another roll, which may have a different diameter within the predetermined range.

As has already been mentioned, the particular construction of transfer mechanism according to the invention above described is suitable for incorporation in a wrapping machine for enclosing a roll (of any diameter within the range) in wrapping material, and the remaining parts of such wrapping machine, in a preferred construction thereof, will now be described. This preferred construction of wrapping machine, illustrated in FIGURES 6–13, incorporates the inventions of the four co-pending patent applications above mentioned.

In this construction of wrapping machine, the inclined ramp B, $B^1$, the gauging device C, $C^1$ and pneumatic control device $C^2$, the control bar F and the transfer mechanism are arranged in the manner described with reference to FIGURES 1 and 2, the same reference letters being used. The vertical wall $B^5$ extending directly down from the lower edge of the lower ramp portion B is however replaced by a separate vertical wall J (the "inner wall"), whose upper edge lies beneath but spaced from the lower edge of the ramp B, the wall J being secured to the lower ramp portion B by means of a box-like bracket $J^1$, which slides on guide rails $J^2$ parallel to the inclined ramp B, $B^1$ and contains parts of the wrapping machine to be described later. Further, this construction incorporates the above-mentioned second vertical wall K (the "outer wall") lying parallel to the inner vertical wall J and at the same distance as such wall from the vertical datum plane E on the opposite side thereof. This outer wall K is guided by linear ball bearings, diagrammatically indicated at $K^1$, to move horizontally, such movement being effected by the pneumatic ram $F^2$ through a linkage $K^2$, so that the two walls J and K will each be spaced from the datum plane E by half the diameter of the roll A and will thus together form a vertical well for guiding the roll into its peripheral and axial operative positions.

The paper or other wrapping material L is fed from a supply reel $L^1$, the width of the web of wrapping material from the reel being somewhat greater than the axial length of the roll A to be wrapped, so that, when the cylindrical surface of the roll has been wrapped, the tube of wrapping material thus formed will project beyond the ends of the roll. The amount of such projection is not critical and may vary within fairly wide limits, so that a given web width will adequately serve for an appreciable range of different lengths of roll, as well as with the predetermined range of roll diameters. The machine may be so arranged that it can be operated with webs of wrapping material of two or more standard widths, so that it will be capable of dealing with a wide range of different lengths of roll, if desired.

For controlling the wrapping material L, the machine is provided with a clamping device M, $M^1$ for gripping the free end of the web, and with a retractable head N for controlling the feeding of the web into the machine.

The clamping device M, $M^1$ is located just beneath the lower end of the inclined ramp B, $B^1$ and is carried by the movable lower portion B of such ramp. This clamping device consists of a clamping face M inclined more steeply to the horizontal than the ramp itself, and a moving member in the form of a pivoted arm $M^1$ having a shaped end which engages with the clamping face with a wedging action to grip the free end of the web L of wrapping material. The clamping arm $M^1$ is operated by a pneumatic cylinder $M^2$ carried beneath the ramp.

The retractable head N normally occupies a position adjacent to the lower edge of the inclined ramp B, and its front wall is used to constitute the stop for holding the roll A in the gauging position. The head N is movable horizontally away from the ramp B, $B^1$ under the control of another pneumatic ram $N^1$, to release the roll A from the gauging position. The base of the retractable head lies slightly above the fixed peripheral datum $E^1$.

The web L of wrapping material passes from the clamping device M, $M^1$ between the lower edge of the ramp B and the front wall of the retractable head N, and thence over the top of the retractable head past guide rollers $L^2$, $L^3$, $L^4$ and a compensating roller $L^5$ to the supply reel $L^1$, from which the web of wrapping material is drawn. The compensating roller $L^5$ is suspended in a loop of the web and serves to take up the slack in the web when the retractable head N is withdrawn. For this purpose, the weight of the compensating roller $L^5$ is relied upon, but it is desirable to keep this roller as light as possible in order not to interfere with proper action of the roll. On the other hand, a somewhat heavier roller may sometimes be required when fresh wrapping material is to be drawn from the supply reel. This difficulty can be overcome by keeping the roller light and applying an additional downward force, for example pneumatically, at the time when wrapping material is being drawn from the supply reel $L^1$.

The trip device, which is operated when the various parts have been set in position in accordance with the roll diameter, acts to operate the movement of the retractable head N. This causes the head to be withdrawn away from the ramp B, $B^1$ to permit the roll A to move forward from the gauging position towards the peripheral operative position. As the head N moves away from the ramp, the wrapping material L is stretched across the path of the roll A so that the roll falls against the web and carries it with it in its downward movement. Another trip device $K^3$, which is carried by the outer wall K so that its position has also been set by the pneumatic control device $C^2$ in accordance with the roll diameter, comes into action to stop and reverse the movement of the retractable head N when the front face of the head has reached a position in its withdrawing movement at which it is at a horizontal distance from the fixed peripheral datum $E^1$ equal to half the roll diameter, thus freeing the roll A to fall into the peripheral operative position, with its uppermost generator located at the fixed peripheral datum $E^1$. In this position, shown in FIGURE 7, the web L of wrapping material extends down from the clamping device M, $M^1$ along the inner wall J and thence around the lower half of the roll periphery and up the outer wall K and over the front face of the retractable head N, thus completing the wrapping of the lower half of the periphery of the roll A.

The trip device $K^3$, which stops and reverses the retractable head N, also causes the pneumatic cylinder $M^2$, which controls the clamping device M, $M^1$, to release the clamp and at the same time operates another pneumatic cylinder $O^1$ to cause longitudinal movement of folder fingers O, so that such fingers move through the gap over the top of the inner wall J and engage with the released end of the web L of wrapping material and wrap it round part of the upper portion of the periphery of the roll A. The two folder fingers O may, if desired, be connected together by a folder bar engaging with the wrapping material over the whole width of the web. Each folder finger O carries one end of a springy strip $O^2$, the other end of which is coiled into the form of a spiral spring $O^3$ carried by the inner wall J, the strip passing from the folder finger over the top of the inner wall and down the face thereof and thence through a hole in the wall to the coiled end $O^3$. These springy strips $O^2$ act to assist in folding the wrapping material closely against the surface of the roll and also to minimise risk of the wrapping material being dragged off the roll surface when the folder fingers are withdrawn.

It is important to ensure that the free edge of the wrapping material will lie at or close to the fixed peripheral datum $E^1$, so that the operative position of the clamping device M, $M^1$ at the time of release should be at a vertical distance approximately equal to $\pi R/2$ above the horizontal plane through the roll axis, where R is the radius of the roll, that is $(\pi/2-1)R$ above the horizontal plane through the fixed peripheral datum $E^1$, for all roll diameters. This is ensured by arranging that the plane of the inclined ramp B, $B^1$ (which passes very close to the clamping device) passes approximately through the fixed peripheral datum $E^1$, and that the clamping device moves in the direction of such plane, the necessary inclination of the ramp B, $B^1$ to the horizontal being approximately equal to the angle whose tangent is $(\pi/2-1)$, such angle in fact being very slightly less than 30 degrees.

While the folder fingers O have been wrapping the free end of the web L of wrapping material over the roll A, the retractable head N has been moving towards its normal position and, in doing so, has been wrapping the web L over the remainder of the upper part of the roll periphery, so that finally it overlaps the free edge of the wrapping material and grips such edge tightly against the roll surface (see FIGURE 8). When the head N has completed its return movement, the folder fingers O are withdrawn by their actuating pneumatic cylinder $O^1$, and a cutting device and a sealing device, which are housed within the interior of the retractable head N, are brought into action to sever the web of wrapping material and to apply adhesive tape along the overlapping edges to seal the wrapping in position. The adhesive on the tape may be of the type requiring wetting or alternatively may be of the self-adhesive type applied by pressure. If the wrapping material consists of thermoplastic material, it will sometimes be preferable to effect such sealing by the application of heat along the overlapping edges, instead of using adhesive tape. The sealing can also be effected, if desired, by applying an adhesive to the free edge of the web of wrapping material after this has been wrapped by the folder fingers around the roll surface and prior to the return movement of the retractable head, so that such return movement will itself complete the sealing by pressing the wrapping material tightly against the adhesive after which the cutting is proceeded with.

In the example illustrated, the cutting device consists of a guillotine P operated by a pneumatic cylinder $P^1$ mounted within the retractable head N. The sealing device comprises a reel $P^2$ of adhesive tape, of width similar to that of the web L of wrapping material, a wedge cam $P^3$ operated by a pneumatic cylinder $P^4$, for feeding forward a predetermined short length of tape from the reel $P^2$ and holding it clamped when fed forward, and a pivoted actuating plate $P^5$ also extending for the full width of the web L. This actuating plate $P^5$ is moved forward, as soon as the retractable head N has completed its return movement to the advanced position, by a pneumatic cylinder $P^6$, and is meanwhile held in position on the piston rod of such cylinder by a small auxiliary pneumatic cylinder $P^7$ pivoted to such piston rod. During this movement, the actuating plate $P^5$ severs the adhesive tape against a reaction plate $P^8$, the severed portion of tape being held to the plate $P^5$ by a pneumatic suction device, part of the suction pipe being indicated at $P^9$. The forward movement of the actuating plate $P^5$ continues until the roll A is engaged, the pneumatic force acting on the plate thus serving to hold the web L of wrapping material tightly against the roll. At this stage, the guillotine P is advanced to sever the web L and is withdrawn again, after which the auxiliary pneumatic cylinder $P^7$ is operated to swing the actuating plate $P^5$ about its pivot and thus to press the adhesive tape firmly into engagement over the overlapping edges of the web L of wrapping material around the roll A, the suction holding the tape to the plate being released. The actuating plate $P^5$ is then swung back and returned to its normal position, in readiness for further actuation of the wedge cam $B^3$ to feed forward another short length of tape. It is assumed, in this description, that the adhesive on the tape is of the self-adhesive type applied by pressure, but if it is preferred to employ an adhesive requiring wetting, a movable wetting device may be incorporated to wet the tape during the forward movement of the actuating plate $P^5$.

It is to be noted that the return movement of the retractable head N draws further wrapping material from the supply reel $L^1$, in readiness for the wrapping of the next roll, and the fact that the web L is in tension ensures a tight grip of the wrapping material on the surface of the roll A and on the free edge which it overlaps. In order to prevent the compensating roller $L^5$ from pulling the web back when it has been severed by the cutting device P, it is desirable to provide a clamp for clamping the web to the top of the retractable head. This clamp $N^2$ may be operated pneumatically simultaneously with the cutting device P and may be subsequently released when the clamping device M, $M^1$ beneath the inclined ramp B, $B^1$ is later operated to grip the new free end of the web. Alternatively, such clamp may be of the spring-urged wedge type, which will allow the wrapping material to be freely drawn through it in one direction, namely from the supply reel $L^1$, but will automatically lock the wrapping material against movement through the clamp in the opposite direction.

The shape of the lower part of the front wall of the retractable head N is made such that it will direct the severed end of the web L of wrapping material towards the clamping device M, $M^1$ beneath the inclined ramp B, $B^1$. Thus, the front wall of the head has a reentrant portion into which the lower end of the inclined ramp projects, when the parts are in their normal positions, so that the severed free end of the web will be in a position in which it will be picked up and tightly gripped by the clamping device M, $M^1$, when such device is operated at the end of the cycle of operations after the resetting of the inclined ramp B, $B^1$ to its normal position.

It will be clear that the amount of overlap between the two free edges of the wrapping material on the wrapped roll will be determined by the amount of material held in the clamping device M, $M^1$. In the interests of economy it is desirable to reduce the amount of overlap to a minimum, but the desirable minimum differs for different types of wrapping material, and it is useful therefore to provide an adjustment for determining the amount of overlap. For this purpose, a movable roller (not shown) may be provided for engaging the web between two fixed rollers, thus producing a loop of adjustable size in the web, whereby the amount of the web which projects from the lower part of the front wall of the retractable head into the path of the movable clamping member can be varied.

When the cutting and sealing operations are completed, a further trip device (not shown) is operated which acts to cause the air to be exhausted from the release cylinders $F^7$ of the transfer mechanism, thus releasing the stop device $G^5$, so that the roll A enclosed in its tube of wrapping material falls, carrying the stop device $G^5$ with it, until brought to rest in the axial operative position by the engagement of the stop device with the abutment cams $F^5$. At this stage, the tube of wrapping material around the periphery of the roll projects beyond the ends of the roll, and the roll is ready for the completion of the wrapping by folding over the projecting ends of such tube against the ends of the roll and thereafter sealing such folded ends in position by means of an adhesive disc. Whilst such end closure can be effected in other ways, it is preferred to utilise the inventions forming the subject of the copending United States patent applications Serial Nos. 260,580 and 271,227, above mentioned.

The two projecting ends of the tube of wrapping material are simultaneously folded over by means of two end pleating units of the kind described in the specification of application Serial No. 260,580, the axes of which are mounted in the machine in alignment with the fixed axial datum and therefore with the axis of the roll which is now in the axial operative position. The two end pleating units are mounted for adjustment in the axial direction to cater for differing lengths of roll. In some instances, the adjustment may cater only for two or more standard lengths of roll (in one arrangement, for example for two lengths respectively 24 and 30 inches), with the unit frameworks accurately bolted in their positions of adjustment, while in other instances the adjustment may be continuous to cater for any length of roll within a predetermined range. When such axial adjustment has been effected, if needed, the two end pleating units are operated.

One convenient construction for each pleating unit is shown in FIGURES 9 and 10. In this construction, the pleating unit comprises a main shaft Q, mounted coaxially with the fixed axial datum $E^2$ in suitable bearings $Q^1$, and having near its forward end a polygonal boss $Q^2$ (shown in transverse section in FIGURE 10). A channel-shaped member $Q^3$ is mounted on each of the flat faces of this boss $Q^2$ and carries a pivot pin $Q^4$, on which a crank arm $Q^5$, sandwiched between the limbs of the channel member $Q^3$, is pivoted. Such crank arms $Q^5$, for example eight in number, normally radiate outwardly from the main shaft Q (in the position indicated in dotted line in FIGURE 9) at equal angular intervals around the shaft. Pivoted to the outer end of each crank arm, is a folder plate $Q^6$ having an operative sector-shaped face, the pivot $Q^7$ being near the narrow end of such face, and a spring $Q^8$ urges the folder plate about its pivot away from the end of the crank arm towards the position shown dotted in FIGURE 9. Keyed to the shaft Q is a collar R, which can slide axially along the shaft, this collar carrying pivots for eight connecting links $R^1$, whose other ends are pivoted respectively to the eight crank arms. This collar R has a circumferential groove $R^2$ within which on opposite sides engage two pins on the forked end of a pivoted lever $R^3$, which is swung about its pivot to move the collar along the shaft by the operation of a pneumatic cylinder $R^4$. Another pneumatic cylinder $R^5$, when operated, acts on a crank arm $R^6$ extending from the shaft Q to rotate the shaft through an angle of, say, one and a half times the angular spacing between the crank arms $Q^5$, that is through about 67 degrees when there are eight crank arms.

The shaft Q is made hollow, so that it can be used as a pneumatic cylinder for operating on a piston S, which is normally pressed by a spring $S^1$ against a shoulder in the shaft bore $S^2$ and is connected to a plunger $S^3$, whereby when pressure fluid is admitted to the shaft bore $S^2$, the plunger $S^3$ is forced out from the front end of the shaft. This plunger serves, in conjunction with a similar plunger in the end pleating unit at the other end of the roll A, for properly centering the roll between the two units before the pleating operation, and it is also used in the subsequent end sealing operation, as will be described later.

Thus, when the roll A (already enclosed around its peripheral surface within a tube of wrapping material whose ends project beyond the ends of the roll) moves under the control of the transfer mechanism into the axial operative position, the plungers $S^3$ of the two end pleating units are pneumatically operated to effect centering of the roll between the two units, and are retracted again to their normal positions. The pneumatic cylinders $R^4$ of the two units are then operated to slide the collars R along the shafts Q, and thereby to cause the crank arms $Q^5$ to swing inwardly. The dimensions of the parts are such that, during such inward movement, the broader ends of the faces of the folder plates $Q^6$ will engage with the wrapping material around the end edge of the roll, so that during the further inward movement the folder plates will turn on their pivots and fold the projecting ends of the tube of wrapping material tightly against the ends of the roll itself. Thus, at the end of the inward movement, a number of sector-shaped portions of the wrapping material will be pressed tightly against the end face of the roll, whilst between such portions there will be upstanding free folds of the wrapping material. The pneumatic cylinders $R^5$ of the two units are now operated to rotate the shafts Q and thereby to cause the folder plates to sweep round and to flatten out into pleats the upstanding free folds of the wrapping material. This completes the pleating operation, and the pneumatic cylinders are then operated at each end to retract the collar R and to rotate the shaft to bring the pleating units back to their normal positions, in readiness for end sealing by the application of adhesive discs over the pleated ends of the wrapping material.

Such end sealing operation is preferably carried out at each end by means of an end sealing unit of the kind described in the specification of the copending United States patent application Serial No. 271,227. One convenient construction of end sealing unit will now be described with reference to FIGURES 11 and 12.

The end sealing unit comprises a suction device, which is mounted on the end of a pivoted arm and acts to withdraw an adhesive disc from a magazine, and to transfer such disc past a wetting device to a position in which the disc is applied over the pleated end of the wrapping material on the roll. To cater for the range of different roll diameters, three different sizes of adhesive discs are provided, stacked respectively in three magazines T, which are mounted in line with one another in a framework $T^1$ movable along rails $T^2$ to bring the appropriate magazine into the operative position, in accordance with whether the actual roll diameter as measured by the gauging device lies within the portion of the range for which the particular size of disc is suitable. The movement of the framework is controlled by two pneumatic cylinders $T^3$ and $T^4$, of which one is carried by the framework $T^1$ and the other is fixed. The operative position corresponds to that occupied, in the drawing, by the middle magazine, the fixed cylinder $T^3$ being operated when it is required to bring the smallest magazine into the operative position, whilst the cylinder $T^4$ is operated to bring the largest magazine into such position. The pivoted arm U normally occupies the position with the suction device in front of the middle magazine.

The pivoted arm, which carries the suction device, consists of two bars U strutted together with a block $U^1$ between them carrying the pivot pin $U^2$, for the arm U. The block $U^1$ is mounted on the stub shaft $U^3$ and is moved from one operative position to the other through a crank arm $U^5$ by a pneumatic cylinder $U^4$. The block $U^1$ also carries stops (not shown) for limiting the movement of the arm U about its pivot $U^2$. The two bars U carry at their free ends a plate V having in its central portion an orifice within which a suction manifold $V^1$ is pivoted, this manifold carrying two suction cups $V^2$ to which suction can be applied, when required, through a suction pipe, a portion of which is shown at $V^3$. The manifold is normally held by a spring $V^4$ in a retracted position within the orifice in the plate V and is advanced into engagement with the front disc in the magazine T by means of a pneumatic cylinder $V^5$.

The magazine T may be arranged in a variety of ways, but in the example illustrated consists of a cylindrical container for housing the stack of discs, with a plunger $T^5$ for advancing the discs towards the open mouth of the magazine. The plunger is operated by a pneumatic cylinder $T^6$ and is provided with leaf springs $T^7$ or other means for frictionally holding the plunger in position when the pneumatic cylinder is not energised. The part of the open mouth of the magazine nearer the pivot $U^2$ of the pivoted arm U is covered by a lid $T^8$ whose edge is cut with a central V-shaped reentrant. A sharp spike $T^9$ is secured to the wall of the magazine T so as to project over the edge of the mouth at the point thereof furthest from the pivot $U^2$ in front of the V-shaped reentrant.

In operation, when the magazine framework $T^1$ has been operated in accordance with the roll diameter to bring the correct magazine T into the operative position adjacent to the suction device on the pivoted arm U, the completion of the operation of the pleating units causes the pneumatic cylinder $V^5$ to be energised. This acts on the suction manifold $V^1$, but first swings the arm U about its pivot $U^2$ through a small angle from its normal position towards the magazine T and thereafter moves the suction manifold $V^1$ about its pivot to bring the two suction cups $V^2$ into engagement with the end disc in the stack in the magazine T, the two cups $V^2$ being in line with the sharp spike $T^9$ and the apex of the V-shaped reentrant. At the same time, suction is applied to the two suction cups $V^2$ and the pneumatic cylinder $T^6$ is operated to exert pressure on the stack of discs towards the mouth of the magazine. The magazine T may be tilted slightly to ensure proper engagement of both suction cups $V^2$ with the end disc. When the suction cups have adhered to the disc, the pneumatic cylinders $V^5$ and $T^6$ are deenergised so that the suction manifold $V^1$ is withdrawn by its spring $V^4$ and the pivoted arm U also swings back under spring action about its pivot $U^2$. This causes the end disc to be withdrawn by suction from the stack through the mouth of the magazine. The V-shaped reentrant in the magazine lid $T^8$ produces a V-shaped compound fold in the disc as it is being withdrawn from the magazine, and this affords an almost certain guarantee that only a single disc will be withdrawn. The sharp spike T⁹ is provided to eliminate any faint residual risk of withdrawal of more than a single disc. For the disc is impaled on the spike as it is being withdrawn, so that the small edge portion of the disc between the spike and the disc edge must be severed before complete withdrawal of the disc, the position of the spike being so chosen that the force necessary to sever such edge portion is greater than the frictional force tending to hold two discs in contact with one another. The disc when withdrawn seats itself against the flat face of the plate V of the suction device and is firmly held against such face by the suction force during the subsequent movement of the arm U.

The pneumatic cylinder U⁴ is now operated to swing the arm U about the shaft U³ to bring the suction device into line with the axis of the roll A, the exposed adhesive surface of the disc being wiped past a wetting device U⁶ during such movement of the arm U. At the completion of such movement, pressure fluid is admitted to the bore S² in the shaft S of the end pleating unit, so that the plunger S³ moves forward and strikes the back of the plate V of the suction device to swing the arm U about its pivot U² and force the wetted adhesive disc tightly into engagement with the pleated end of the wrapping material on the roll A, the suction being released at the same time so that the disc will adhere firmly to seal the end of the wrapping on the roll. Pressure is then released from the bore of the shaft S, so that the arm U is withdrawn by spring action and the pneumatic cylinder U⁴ is then again operated to return the arm U to its normal position in front of the magazines, the wetting device meanwhile being temporarily rotated or otherwise moved to prevent wetting of the plate V during such return movement. The end sealing is of course simultaneously effected by two similar end sealing units at both ends of the roll A.

When this end sealing operation has been completed, a pivoted flap J³ constituting the lower portion of the inner vertical wall J (see FIGURE 6) is released, so that the wrapped roll A falls from the axial operative position on to the delivery chute H and is discharged from the machine. This final movement of the roll operates another trip device (not shown) which causes the various parts of the machine controlled by the pneumatic device C² to be reset to their normal positions, in readiness to deal with the wrapping of the next roll, the final movement in the cycle being the operation of the clamping device M, M¹ to grip the free end of the web L of wrapping material, followed by the release of the clamp N² on top of the retractable head N.

It has been found that, in some instances, there is a slight tendency for the wrapping to become loose on the outer wall side during movement of the roll from the gauging position into the peripheral operative position. FIGURE 13 shows a modification of the transfer mechanism to prevent this.

In this modification, a number of straps W (for example three) are passed around the rollers G⁵ of the stop device on the transfer arm G. These straps are each attached at one end to the bottom edge of the outer vertical wall K and then pass around the rollers G⁵ and around rollers W¹ at the top of the outer wall K, their other ends being attached to springs W² anchored to brackets W³ projecting from the outside of the bottom of the outer wall K. These straps W exert a springy pressure clamping the wrapping material tightly to the roll during the downward movement into the peripheral operative position, and when the roll has reached such position the straps urge it against the inner wall J and thus clamp the wrapping to the whole of the lower part of the roll surface. During the subsequent movement of the roll into the axial operative position, the rollers G⁵ roll along the undersurface of the straps, and the tendency of the roll to rotate during such downward movement owing to the provision of the straps will have an advantageous effect in pressing the sealing tape more tightly against the overlapping ends of the wrapping material.

Alternatively (or in addition) any tendency to loose wrapping around the peripheral surface of the roll may be minimised by a modification of the sequence of operations, whereby the folder fingers O are moved forward to wrap the upper portion of the roll on the inner wall side, before the web L is released from the clamping device M, M¹ but after the clamp N² has been applied to stop further feed of wrapping material from the supply reel L¹. The roll will thus be lifted slightly from the stop device G⁵, thus ensuring a tight wrap, the clamping device M, M¹ being released just before the folder fingers complete their inward wrapping movement, so that the roll returns on to the stop device G⁵ in readiness for its subsequent downward movement after the peripheral wrapping has been sealed in place.

The pneumatic circuits, whereby the pneumatic control device C² controls the various parts of the apparatus and the desired sequential operation of the parts of the apparatus is ensured, are not shown in the drawings, but it will be understood that such circuits may be arranged in any of the well-known ways to ensure the desired operations. It will also be understood that such control may be effected hydraulically or electrically or mechanically or in other ways, if desired, instead of pneumatically.

It will be appreciated that the foregoing constructions of transfer mechanism and of wrapping machine have been described by way of example only and may be modified in various ways within the scope of the invention. Thus, for instance, it is not essential to the invention for the roll axis to be horizontal and for gravity to be relied on for the movements of the roll between its various operative positions. The arrangement may alternatively be such, for example, that the roll axis is vertical, suitable means being provided for feeding the roll forward from position to position. Such an arrangement may be useful in some instances when the transfer mechanism is applied to purposes other than wrapping. Thus, the transfer mechanism may be utilized for feeding cans or bottles in turn into a peripheral operative position, in which some process such as cleaning or printing on the surface or the application of a label thereto is carried out, and into an axial operative position, wherein the can or bottle is filled through an axial orifice and the orifice is closed by a stopper or otherwise. More generally, the transfer mechanism may be used for dealing with any type of article, having a cylindrical surface for at least part of its length, and on which it is desired to perform some surface operation and, either before or afterwards, some other operation involving proper centering of the axis of the article, in cases where the article may have any diameter within a predetermined range.

What I claim as my invention and desire to secure by Letters Patent is:

1. Transfer mechanism for locating a body (which at least for part of its length is of generally cylindrical shape having a diameter which may have any value within a predetermined range) in turn in two operative positions, in one of which (the "peripheral operative position") one of the generators of the cylindrical surface of the body coincides with a predetermined fixed datum line (the "fixed peripheral datum") whilst in the other (the "axial operative position") the cylinder axis of the body coincides with another predetermined datum line (the "fixed axial datum") parallel to the fixed peripheral datum, such transfer mechanism comprising in combination a gauging device for measuring the diameter of the body, control means responsive to the operation of the gauging device, a stop device position by the control means in accordance with the diameter of the body for engaging with part of the cylindrical surface of the body and thereby locating the body in one of its two operative positions, abutment means also positioned by the control means in accordance with the diameter of the body, and means for releasing the stop device to permit movement of the body into its second operative position determined by the abtument means.

2. Transfer mechanism as claimed in claim 1, including means whereby the stop device on release moves into engagement with the abutment means and thereby itself acts when so engaged to locate the body in the second operative position.

3. Transfer mechanism as claimed in claim 2, including a pivoted transfer arm carrying the stop device, a second arm extending from the transfer arm and constituting therewith a pivoted two-armed crank lever, and means whereby the control means actuates such second arm and thereby acts to position the stop device on operation of the gauging device.

4. Transfer mechanism as claimed in claim 3, including a coupling which connects the abutment means to the second arm of the crank lever and through which the control means actuates such second arm, and means for breaking such coupling to effect the release of the stop device whilst leaving the abutment means still held in position for locating the body in the second operative position.

5. Transfer mechanism as claimed in claim 4, in which the body is arrested by the stop device in the peripheral operative position and after release of the stop device moves into the axial operative position, the abutment means and the point of the second arm to which the abutment means is coupled being moved by the control means each to a position at a distance from a fixed zero equal to the diameter of the body divided by the transmission ratio of the crank lever, the abutment means consisting of a cam for receiving the stop device after release thereof.

6. Transfer mechanism as claimed in claim 1, including a pivoted transfer arm carrying the stop device, a second arm extending from the transfer arm and constituting therewith a pivoted two-armed crank lever, and means whereby the control means actuates such second arm and thereby acts to position the stop device on operation of the gauging device.

7. Transfer mechanism as claimed in claim 6, including a coupling which connects the abutment means to the second arm of the crank lever and through which the control means actuates such second arm, and means for breaking such coupling to effect the release of the stop device whilst leaving the abutment means still held in position for locating the body in the second operative position.

8. Transfer mechanism as claimed in claim 1, including a breakable coupling between the control means and the stop device, and means for breaking such coupling for effecting release of the stop device whilst leaving the abutment means still held in position for locating the body in the second operative position.

9. Transfer mechanism as claimed in claim 8, in which the breakable coupling consists of a fluid-pressure device through which the abutment means is connected to the stop device, the release of the stop device being effected by exhausting the pressure fluid from such fluid-pressure device.

10. Transfer mechanism as claimed in claim 1, including guiding means for guiding the body to move along a substantially straight-line path parallel to the plane containing the two fixed datum lines in its movement from the first to the second operative position.

11. Transfer mechanism as claimed in claim 10, in which the said guiding means comprises a movable wall, and means whereby such wall is moved by the control means on operation of the gauging device to a position distant half the diameter of the body from the plane containing the two fixed datum lines, whereby the cylinder axis of the body remains in such plane during movement from the first to the second operative position.

12. A wrapping machine, for enclosing in wrapping material a "roll" (as defined herein) having any diameter within a predetermined range, including in combination, a gauging device for measuring the diameter of the roll, control means responsive to the operation of the gauging device, a stop device positioned by the control means in accordance with the diameter of the roll for engaging with the cylindrical surface of the roll and thereby locating the roll in one of two operative positions, in one of which (the "peripheral operative position") one of the generators of the cylindrical surface of the roll coincides with a predetermined fixed datum line (the "fixed peripheral datum") and in the other of which (the "axial operative position") the cylinder axis of the roll coincides with another predetermined fixed datum line (the "fixed axial datum") parallel to the fixed peripheral datum, means for feeding the roll to the gauging device and therefrom to the operative position determined by the stop device, abutment means also positioned by the control means in accordance with the roll diameter for locating the roll in its other operative position, means for releasing the stop device to permit movement of the roll into the operative position determined by the abutment means, means whereby the cylindrical surface of the roll is wrapped with wrapping material in the peripheral operative position of the roll, and means whereby in the axial operative position of the roll a further operation requiring centering of the roll is performed on the roll.

13. A wrapping machine as claimed in claim 12, in which the roll is located first in its peripheral operative position and thereafter in its axial operative position, and the said further operation performed in the axial operative position consists in enclosing the ends of the roll in wrapping material.

14. A wrapping machine as claimed in claim 13, including means for feeding wrapping material across the path of the roll between the gauging position and the peripheral operative position whereby the roll engages with such wrapping material and carries such material with it in its movement into the peripheral operative position thereby wrapping the material around part of the cylindrical surface of the roll, means whereby in such peripheral operative position the wrapping of the cylindrical surface of the roll is completed thereby enclosing the roll within a tube of wrapping materlai which projects beyond the ends of the roll, and means whereby when the roll has moved into the axial operative position the projecting ends of the tube of wrapping material are folded against the ends of the roll and such folded ends are sealed in position.

15. A wrapping machine as claimed in claim 14, including a pivoted transfer arm carrying the stop device, a second arm extending from the transfer arm and constituting therewith a pivoted two-armed crank lever, a coupling which connects the abutment means to such second arm and through which the control means actuates the second arm to position the stop device on operation of the gauging device, and means for breaking such coupling to effect the release of the stop device whilst leaving the abutment means still held in position for locating the roll in the axial operative position.

16. A wrapping machine as claimed in claim 12, including a pivoted transfer arm carrying the stop device, a second arm extending from the transfer arm and constituting therewith a pivoted two-armed crank lever, and means whereby the control means actuates such second arm and thereby acts to position the stop device on operation of the gauging device.

17. A wrapping machine as claimed in claim 12, including a breakable coupling between the control means and the stop device, and means for breaking such coupling for effecting release of the stop device whilst leaving the abutment means still held in position in accordance with the roll diameter.

18. A wrapping machine as claimed in claim 17, including means whereby the stop device on release moves into engagement with the abutment means and thereby itself acts when so engaged to locate the roll in the operative position determined by the abutment means.

19. A wrapping machine as claimed in claim 13, including a movable wall extending parallel to the plane containing the two fixed datum lines for guiding the roll in its passage from one of its two operative positions to the other, and means whereby such wall is moved by the control means on operation of the gauging device to a position distant half the roll diameter from the said plane whereby the cylinder axis of the roll remains in such plane during its movement from one operative position to the other.

No references cited.

FRANK E. BAILEY, *Primary Examiner.*

L. S. BOUCHARD, *Assistant Examiner.*